United States Patent
Achanta et al.

(10) Patent No.: US 9,813,173 B2
(45) Date of Patent: Nov. 7, 2017

(54) TIME SIGNAL VERIFICATION AND DISTRIBUTION

(71) Applicant: Schweitzer Engineering Laboratories, Inc., Pullman, WA (US)

(72) Inventors: Shankar V. Achanta, Pullman, WA (US); Srinivas Achanta, Pullman, WA (US); David E. Whitehead, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 14/875,453

(22) Filed: Oct. 5, 2015

(65) Prior Publication Data

US 2016/0099803 A1   Apr. 7, 2016

Related U.S. Application Data

(60) Provisional application No. 62/060,465, filed on Oct. 6, 2014.

(51) Int. Cl.
*H04L 7/00* (2006.01)
*H04J 3/06* (2006.01)
*H04L 29/06* (2006.01)

(52) U.S. Cl.
CPC .......... *H04J 3/0638* (2013.01); *H04J 3/0644* (2013.01); *H04L 63/14* (2013.01)

(58) Field of Classification Search
CPC ......... G06F 1/10; H04J 3/0685; H04J 3/0688; H04J 3/0638; H04J 3/0608; H04L 7/0008; H04L 7/0083; H04L 7/033; H03L 7/143

USPC .................................................. 375/354–376
See application file for complete search history.

(56) References Cited

U.S. PATENT DOCUMENTS

| | | | |
|---|---|---|---|
| 5,160,926 | A | 11/1992 | Schweitzer, III |
| 5,557,284 | A | 9/1996 | Hartman |
| 5,737,715 | A | 4/1998 | Deaton |
| 6,144,334 | A | 11/2000 | Claffey |

(Continued)

FOREIGN PATENT DOCUMENTS

| | | |
|---|---|---|
| WO | 9747987 | 12/1997 |
| WO | 2012151006 | 11/2012 |
| WO | 2014005016 | 1/2014 |

OTHER PUBLICATIONS

Zhou et al., Adaptive Correction Method for an OCXO and Investigation of Analytic Cumulative Time Error Upper Bound, Jan. 2011, IEEE Transactions on Ultrasonics, Ferroelectrics, and Frequency Control, vol. 58, No. 1.

(Continued)

*Primary Examiner* — James M Perez
(74) *Attorney, Agent, or Firm* — Richard M. Edge

(57) ABSTRACT

The time signal verification and distribution device disclosed herein verifies and distributes a time signal to consuming devices. The device determines a time quality status of a first and second time signal, calculates a difference between a first and a second time signal, and compares the difference to a predetermined threshold. Based on the time quality status and the comparison, the time signal verification and distribution device distributes a time signal to a plurality of time signal consuming devices. Exceeding the predetermined threshold may indicate a spoofing attack or other problem with the time signals.

23 Claims, 9 Drawing Sheets

(56) References Cited

U.S. PATENT DOCUMENTS

| | | | |
|---|---|---|---|
| 6,229,479 B1 | 5/2001 | Kozlov | |
| 6,483,856 B1 | 11/2002 | Bird | |
| 7,146,516 B2 | 12/2006 | Dhupar | |
| 7,206,367 B1* | 4/2007 | Moore | H04L 12/66 348/515 |
| 7,375,683 B2 | 5/2008 | Smith | |
| 7,398,411 B2 | 7/2008 | Zweigle | |
| 7,436,232 B2 | 10/2008 | Sivero | |
| 7,440,427 B1 | 10/2008 | Katz | |
| 7,542,537 B2* | 6/2009 | Widera | G04G 7/00 370/252 |
| 7,606,541 B1 | 10/2009 | Nicholls | |
| 7,881,413 B2* | 2/2011 | Nichols | H03L 7/0994 375/354 |
| 7,940,213 B2 | 5/2011 | Harper | |
| 7,952,519 B1 | 5/2011 | Nielsen | |
| 7,978,130 B1 | 7/2011 | Cohen | |
| 7,979,228 B2 | 7/2011 | Zurbuchen | |
| 7,987,059 B2* | 7/2011 | Gong | H02J 3/24 307/102 |
| 8,031,747 B2* | 10/2011 | Barry | H04J 3/0667 370/516 |
| 8,055,288 B2 | 11/2011 | Ladd | |
| 8,138,972 B2 | 3/2012 | Underbrink | |
| 8,159,391 B2 | 4/2012 | Papadimitratos | |
| 8,237,609 B2 | 8/2012 | Talbot | |
| 8,325,087 B2 | 12/2012 | Thomson | |
| 8,326,319 B2 | 12/2012 | Davis | |
| 8,446,896 B2 | 5/2013 | Bedrosian | |
| 8,564,330 B1 | 10/2013 | Radulov | |
| 8,655,608 B2 | 2/2014 | Guzman-Casillas | |
| 8,867,520 B2 | 10/2014 | Nicholls | |
| 8,990,036 B1* | 3/2015 | Schweitzer, III | G01R 31/088 702/58 |
| 9,083,503 B2 | 7/2015 | Sagen | |
| 9,270,442 B2 | 2/2016 | Rice | |
| 9,319,100 B2 | 4/2016 | Achanta | |
| 9,331,804 B2* | 5/2016 | Wong | H04J 3/0638 |
| 9,520,860 B2* | 12/2016 | Whitehead | G06F 1/14 |
| 9,588,168 B2* | 3/2017 | Schweitzer, III | G01R 31/088 |
| 9,709,682 B2* | 7/2017 | Achanta | G01S 19/215 |
| 9,759,816 B2* | 9/2017 | Achanta | G01S 19/215 |
| 2002/0136172 A1 | 9/2002 | Chun | |
| 2002/0158693 A1 | 10/2002 | Soong | |
| 2002/0167934 A1 | 11/2002 | Carter | |
| 2003/0087654 A1 | 5/2003 | Wheeler | |
| 2003/0107513 A1 | 6/2003 | Abraham | |
| 2004/0062279 A1 | 4/2004 | Primrose | |
| 2004/0166879 A1 | 8/2004 | Meadows | |
| 2004/0228368 A1 | 11/2004 | Jecmen | |
| 2006/0259806 A1 | 11/2006 | Zweigle | |
| 2007/0132773 A1 | 6/2007 | Plante | |
| 2007/0194987 A1 | 8/2007 | Fedora | |
| 2008/0062039 A1 | 3/2008 | Cohen | |
| 2008/0169978 A1 | 7/2008 | Powell | |
| 2008/0186229 A1 | 8/2008 | Van Diggelen | |
| 2008/0198069 A1 | 8/2008 | Gronemeyer | |
| 2009/0088990 A1* | 4/2009 | Schweitzer, III | G01R 19/2513 702/58 |
| 2009/0117928 A1 | 5/2009 | Ladd | |
| 2009/0160705 A1 | 6/2009 | Matsuzaki | |
| 2009/0161744 A1* | 6/2009 | Smith | H04B 3/462 375/226 |
| 2009/0290668 A1* | 11/2009 | Nishine | H04J 3/0641 375/356 |
| 2009/0315764 A1 | 12/2009 | Cohen | |
| 2010/0030916 A1 | 2/2010 | Greenwood Graham | |
| 2010/0034190 A1 | 2/2010 | Yun | |
| 2010/0073228 A1 | 3/2010 | Smith | |
| 2010/0117899 A1 | 5/2010 | Papadimitratos | |
| 2010/0127928 A1 | 5/2010 | Thomson | |
| 2010/0190509 A1 | 7/2010 | Davis | |
| 2010/0222068 A1 | 9/2010 | Gaal | |
| 2010/0231445 A1 | 9/2010 | Tarlow | |
| 2010/0231448 A1 | 9/2010 | Harper | |
| 2010/0253578 A1 | 10/2010 | Mantovani | |
| 2010/0254225 A1 | 10/2010 | Schweitzer, III | |
| 2011/0001668 A1 | 1/2011 | Cobb | |
| 2011/0035065 A1* | 2/2011 | Schweitzer, III | H02J 13/0062 700/286 |
| 2011/0035066 A1 | 2/2011 | Schweitzer | |
| 2011/0068973 A1 | 3/2011 | Humphreys | |
| 2011/0085540 A1 | 4/2011 | Kuwabara | |
| 2011/0102258 A1 | 5/2011 | Underbrink | |
| 2011/0102259 A1 | 5/2011 | Ledvina | |
| 2011/0150005 A1* | 6/2011 | Chen | H04J 3/0667 370/503 |
| 2011/0169577 A1 | 7/2011 | Nicholls | |
| 2011/0181466 A1 | 7/2011 | Serrano | |
| 2011/0227787 A1 | 9/2011 | Gum | |
| 2011/0251732 A1* | 10/2011 | Schweitzer, III | H02J 3/12 700/297 |
| 2011/0261917 A1 | 10/2011 | Bedrosian | |
| 2011/0285586 A1 | 11/2011 | Ferguson | |
| 2011/0287779 A1 | 11/2011 | Harper | |
| 2012/0005326 A1 | 1/2012 | Bradetich | |
| 2012/0026037 A1 | 2/2012 | Thomson | |
| 2012/0030495 A1 | 2/2012 | Chandhoke | |
| 2012/0066418 A1 | 3/2012 | Foster | |
| 2012/0087402 A1* | 4/2012 | Patoine | H04J 3/0697 375/226 |
| 2012/0116677 A1 | 5/2012 | Higgison | |
| 2012/0179404 A1 | 7/2012 | Lee | |
| 2012/0182181 A1 | 7/2012 | Dai | |
| 2012/0195253 A1* | 8/2012 | Irvine | H04J 3/0641 370/328 |
| 2012/0195350 A1 | 8/2012 | Das | |
| 2012/0275553 A1* | 11/2012 | Lehane | H04L 41/0846 375/356 |
| 2012/0288280 A1* | 11/2012 | Sui | H04J 3/0655 398/66 |
| 2012/0323397 A1 | 12/2012 | Schweitzer, III | |
| 2013/0157593 A1* | 6/2013 | Achanta | H02H 1/0061 455/84 |
| 2013/0244624 A1 | 9/2013 | Das | |
| 2013/0328606 A1 | 12/2013 | Ravi | |
| 2013/0335266 A1 | 12/2013 | Vollath | |
| 2014/0003199 A1 | 1/2014 | Dougan | |
| 2014/0094218 A1 | 4/2014 | Hammes | |
| 2014/0100702 A1 | 4/2014 | Schweitzer | |
| 2014/0111249 A1 | 4/2014 | Whitehead | |
| 2014/0111377 A1 | 4/2014 | Achanta | |
| 2014/0114608 A1 | 4/2014 | Achanta | |
| 2014/0198784 A1* | 7/2014 | Nakajima | H04J 3/0641 370/350 |
| 2014/0232595 A1 | 8/2014 | Rife | |
| 2014/0247185 A1 | 9/2014 | Achanta | |
| 2014/0250972 A1 | 9/2014 | Achanta et al. | |
| 2014/0254735 A1* | 9/2014 | Nemawarkar | H04L 7/0331 375/376 |
| 2014/0327574 A1 | 11/2014 | Achanta | |
| 2014/0334477 A1 | 11/2014 | Stahlin | |
| 2014/0348278 A1* | 11/2014 | Wong | H04J 3/0638 375/355 |
| 2015/0043697 A1* | 2/2015 | Achanta | H04B 3/04 375/371 |
| 2015/0139375 A1* | 5/2015 | Doi | H04L 7/0012 375/356 |
| 2015/0312023 A1 | 10/2015 | Rice | |
| 2015/0364953 A1 | 12/2015 | Rippon | |
| 2015/0381299 A1* | 12/2015 | Yang | H04J 3/0697 370/509 |
| 2016/0154109 A1* | 6/2016 | Achanta | G01S 19/215 342/357.58 |

OTHER PUBLICATIONS

PCT/US2013/064942 Patent Cooperation Treaty, International Search Report and Written Opinion of the International Searching Authority, dated Jan. 29, 2014.

(56) References Cited

OTHER PUBLICATIONS

Tippenhauer, N.O., Popper, C., Rasmussen, K.B., Capkun, S., On the Requirements for Successful GPS Spoofing Attacks, In Proceedings of the ACM Conference on Computer and Communications Security (CCS), Oct. 2011.
Moore, P., Crossley, P., GPS Applications in Power Systems Part 1 Introduction to GPS, Tutorial: GPS in Power Systems, Power Engineering Journal, Feb. 1999.
Jafarnia-Jahromi, A., Broumandan, A., Nielsen, J., Lachapelle, G., "GPS Vulnerability to Spoofing Threats and a Review of Antispoofing Techniques", International Journal of Navigation and Observation vol. 2012, Article ID 127072, Feb. 2012.
Wullems, C., "A Spoofing Detection Method for Civilian L1 GPS and the E1-B Galileo Safety of Life Service". IEEE Transactions on Aerospace and Electronic Systems, Aug. 2011.
Wen, H., Huang, P. Y., Dyer, J., Archinal, A., Fagan, J., "Countermeasures for GPS Signal Spoofing," Proceedings of the 18th International Technical Meeting of the Satellite Division of the Institute of Navigation (ION GNSS 2005), Long Beach, CA, Sep. 2005, pp. 1285-1290.
Gurtner, W., Estey, L., "Rinex: The Receiver Independent Exchange Format Version 3.00", Nov. 28, 2007.
Gurtner, W., "Rinex: The Receiver Independent Exchange Format Version 2", Sep. 2008.
PCT/US2013/064012, Patent Cooperation Treaty, International Search Report and Written Opinion of the International Searching Authority, dated Dec. 19, 2013.
PCT/US2013/058297, Patent Cooperation Treaty, International Search Report and Written Opinion of the International Searching Authority, dated Feb. 14, 2014.
PCT/US2013/065695, Patent Cooperation Treaty, International Search Report and Written Opinion of the International Searching Authority, dated Mar. 10, 2014.
PCT/US2013/065447, Patent Cooperation Treaty, International Search Report and Written Opinion of the International Searching Authority, dated Mar. 13, 2014.
PCT/US2014/010507 Patent Cooperation Treaty, International Search Report and Written Opinion of the International Searching Authority, dated May 6, 2014.
Shepard, D., Humphreys, T., Fansler, A., "Evaluation of the Vulnerability of Phasor Measurement Units to GPS Spoofing Attacks", Oct. 2, 2011.
PCT/US2014/010422 Patent Cooperation Treaty, International Search Report and Written Opinion of the International Searching Authority, dated Sep. 16, 2014.
PCT/US2014/034358 Patent Cooperation Treaty, International Search Report and Written Opinion of the International Searching Authority, dated Sep. 22, 2014.
PCT/US2014/049813 Patent Cooperation Treaty, International Search Report and Written Opinion of the International Searching Authority, dated Apr. 2, 2015.
PCT/US2015/024000 Patent Cooperation Treaty, International Search Report and Written Opinion of the International Searching Authority, dated Jul. 13, 2015.
PCT/US2015/029939 Patent Cooperation Treaty, International Search Report and Written Opinion of the International Searching Authority, dated Aug. 12, 2015.
PCT/US2015/054144 Patent Cooperation Treaty, International Search Report and Written Opinion of the International Searching Authority, dated Jan. 4, 2016.

* cited by examiner

TIME SIGNAL VERIFICATION AND DISTRIBUTION

RELATED APPLICATION

This application claims the benefit under 35 U.S.C. §119(e) of U.S. Provisional Application No. 62/060,465, filed 6 Oct. 2014, naming Shankar V. Achanta, David E. Whitehead, and Srinivas Achanta as inventors, and titled "Time Signal Authentication and Distribution" which is hereby incorporated by reference herein in its entirety.

TECHNICAL FIELD

This disclosure relates to distributing a time signal in a network. Particularly, this disclosure relates to verifying time signals before distributing a time signal to consuming devices on a network.

BRIEF DESCRIPTION OF THE DRAWINGS

Non-limiting and non-exhaustive embodiments of the disclosure are described, including various embodiments of the disclosure with reference to the figures, in which.

Figure 1:
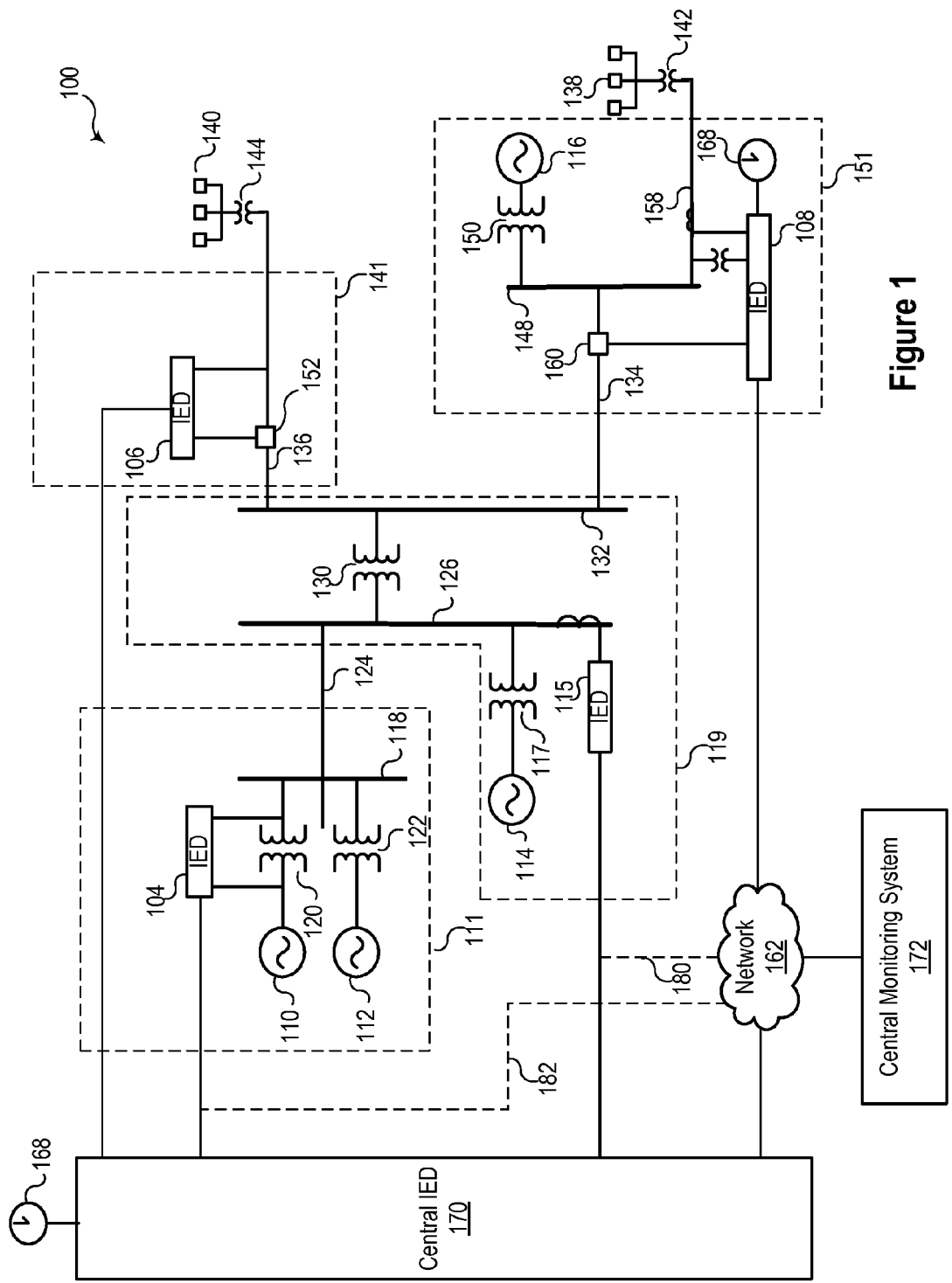
FIG. 1 illustrates an example of an embodiment of a simplified one-line diagram of an electric power delivery system with various substations consistent with embodiments of the present disclosure.

In the following description, numerous specific details are provided for a thorough understanding of the various embodiments disclosed herein. However, those skilled in the art will recognize that the systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

Electric power transmission and distribution systems may utilize precision time information to perform various monitoring, protection, and communication tasks. In connection with certain applications, intelligent electronic devices (IEDs) and network communication devices may utilize time information accurate beyond the millisecond range. IEDs within a power system may be configured to perform metering, control, and protection functions that require a certain level of time precision and accuracy between one or more IEDs. For example, IEDs may be configured to calculate and communicate time-synchronized phasors (synchrophasors), which may require that the IEDs and network devices be synchronized to within nanoseconds of one other. Many protection, metering, control, and automation algorithms used in power systems may benefit from or require receipt of precision time information.

Various systems may be used for distribution of precision time information. According to various embodiments disclosed herein, a power system may include components connected using a synchronized optical network (SONET). In such embodiments, precision time information may be distributed using a synchronous transport protocol and synchronous transport modules (STMs). According to one embodiment, a precision time reference can be transmitted within a frame of a SONET transmission. In another embodiment, a precision time reference may be incorporated into a header or an overhead portion of a SONET STM frame. Similarly, the power system may include components connected using Synchronous Digital Hierarchy (SDH) protocol. Although several embodiments herein are described in terms of SONET, it should be recognized that the SDH protocol may be used in place of SONET unless otherwise specified.

IEDs, network devices, and other devices in a power system may include local oscillators or other time sources and may generate a local time signal. In some circumstances, however, external time signals, provided by a time distribution device, may be more precise and may therefore be preferred over local time signals. A power system may include a data communications network that transmits a precision time reference from the time distribution device to time dependent devices connected to the data communications network. In some embodiments, the communications network may include one or more local area networks (LANs) and one or more wide area networks (WANs). In a system with multiple LANs, multiple time distribution devices (one or more for each LAN) may be connected to the data communications network and each time distribution device can provide a precision time reference to other time distribution devices across the WAN. In each time distribution device, the precision time reference may be received or derived from an external precision time signal.

According to various embodiments, each time distribution device receives multiple precision time signals from various time sources and is configured to provide the best available precision time signal as the precision time reference. The precision time signals may be received using an Inter-Range Instrumentation Group (IRIG) protocol, a global navigation satellite system (GNSS), such as, for example, global positioning system (GPS), GLONASS, or the like, a radio broadcast such as a National Institute of Science and Technology (NIST) broadcast (e.g., radio stations WWV, WWVB, and WWVH), the IEEE 1588 protocol, a network time protocol (NTP) codified in RFC 1305, a simple network time protocol (SNTP) in RFC 2030, and/or another time transmission protocol or system.

While, the above listed precision time signals may provide accurate time to a time distribution device, they vary in quality. For example, the precision of NTP and SNTP is limited to the millisecond range, thus making it inappropriate for sub-millisecond time distribution applications. Further, both protocols lack security and are susceptible to malicious network attacks. The IEEE 1588 standard includes hardware-assisted timestamps, which allows for time accuracy in the nanosecond range. Such precision may be sufficient for more demanding applications (e.g., the sampling of the sinusoidal currents and voltages on power lines to calculate "synchrophasors"). It is well suited for time distribution at the communication network periphery, or among individual devices within the network. GNSS time signals provide a very accurate and robust time measurement, however GNSS signals are susceptible to spoofing. Therefore, it would be beneficial to provide a system and method for detecting failure in any of the received precision time signals such that the best available precision time reference can be provided to time dependent devices.

In certain embodiments, when the time distribution device determines that the connection to the best available time source has failed, a new best available time source may be selected from the remaining available time sources. In addition to relying on a precision time reference from the time distribution device, when available, the various time dependent devices may be configured to enter a holdover period when the precision time reference is unavailable. In some embodiments, a device may be configured to monitor the drift of a local time source with respect to the precision time reference and to retain information regarding the drift. During the holdover period, an IED or network device may rely on a local time signal.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

Reference throughout this specification to "one embodiment" or "an embodiment" indicates that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. In particular, an "embodiment" may be a system, an article of manufacture (such as a computer readable storage medium), a method, and a product of a process.

The phrases "connected to," "networked," and "in communication with" refer to any form of interaction between two or more entities, including mechanical, electrical, magnetic, and electromagnetic interaction. Two components may be connected to each other even though they are not in direct physical contact with each other and even though there may be intermediary devices between the two components.

Some of the infrastructure that can be used with embodiments disclosed herein is already available, such as: general-purpose computers, computer programming tools and techniques, digital storage media, and optical networks. A computer may include a processor such as a microprocessor, microcontroller, logic circuitry, or the like. The processor may include a special purpose processing device such as an ASIC, PAL, PLA, PLD, Field Programmable Gate Array, or other customized or programmable device. The computer may also include a computer readable storage device such as non-volatile memory, static RAM, dynamic RAM, ROM, CD-ROM, disk, tape, magnetic, optical, flash memory, or other computer readable storage medium.

As used herein, the term IED may refer to any microprocessor-based device that monitors, controls, automates, and/or protects monitored equipment within the system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. IEDs may be connected to a network, and communication on the network may be facilitated by networking devices including, but not limited to, multiplexers, routers, hubs, gateways, firewalls, and switches. Furthermore, networking and communication devices may be incorporated in an IED or be in communication with an IED. The term IED may be used interchangeably to describe an individual IED or a system comprising multiple IEDs.

IEDs, network devices, and time distribution devices may be physically distinct devices, may be composite devices, or may be configured in a variety of ways to perform overlapping functions. IEDs, network devices, and time distribution devices may comprise multi-function hardware (e.g., processors, computer-readable storage media, communications interfaces, etc.) that can be utilized in order to perform a variety of tasks, including tasks typically associated with an IED, network device, and/or time distribution device. For example, a network device, such as a multiplexer, may also be configured to issue control instructions to a piece of monitored equipment. In another example, an IED may be configured to function as a firewall. The IED may use a network interface, a processor, and appropriate software instructions stored in a computer-readable storage medium in order to simultaneously function as a firewall and as an IED. In another example, an IED may include the necessary hardware and software instructions to function as a time distribution device for other IEDs in a LAN or WAN. In order to simplify the discussion, several embodiments disclosed herein are illustrated in connection with time distribution devices; however, one of skill in the art will recognize that the teachings of the present disclosure, including those teachings illustrated only in connection with time distribution devices, are also applicable to IEDs and network devices.

Aspects of certain embodiments described herein may be implemented as software modules or components. As used herein, a software module or component may include any type of computer instruction or computer executable code located within a computer readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a computer readable storage medium, which together implement the described functionality of the module. Indeed, a module may comprise a single instruction or many instructions, and may be distributed over several different code segments, among different programs, and across several computer readable storage media. Some embodiments may be practiced in a distributed computing environment where tasks are performed by a remote processing device linked through a communications network. In a distributed computing environment, software modules may be located in local and/or remote computer readable storage media. In addition, data being tied or rendered together in a database record may be resident in the same computer readable storage medium, or across several computer readable storage media, and may be linked together in fields of a record in a database across a network.

The software modules described herein tangibly embody a program, functions, and/or instructions that are executable by computer(s) to perform tasks as described herein. Suitable software, as applicable, may be readily provided by those of skill in the pertinent art(s) using the teachings presented herein and programming languages and tools, such as XML, Java, Pascal, C++, C, database languages, APIs, SDKs, assembly, firmware, microcode, and/or other languages and tools.

A precision time reference refers to a time signal or time source relied on by a plurality of devices and distributed by a time distribution device, and which is presumed to be more precise than a local time source. The determination of accuracy may be made based upon a variety of factors. A precision time reference may allow for specific moments in time to be described and temporally compared to one another.

A time source is any device that is capable of tracking the passage of time. A variety of types of time sources are contemplated, including a voltage-controlled temperature compensated crystal oscillator (VCTCXO), a phase locked loop oscillator, a time locked loop oscillator, a rubidium oscillator, a cesium oscillator, a trained oscillator, a microelectromechanical device (MEM), and/or other device capable of tracking the passage of time.

A time signal is a representation of the time indicated by a time source. A time signal may be embodied as any form of communication for communicating time information. A wide variety of types of time signals are contemplated, such as those listed above. Time source and time signal may be used interchangeably herein.

Failure of a precision time source and/or precision time signal, as used herein, includes spoofing and/or jamming the signal, mechanical or software failures, system wide outages, etc. Failure of a time source results in a time source that is no longer reliable.

Furthermore, the described features, operations, or characteristics may be combined in any suitable manner in one or more embodiments. It will also be readily understood that the order of the steps or actions of the methods described in connection with the embodiments disclosed herein may be changed, as would be apparent to those skilled in the art. Thus, any order in the drawings or detailed description is for illustrative purposes only and is not meant to imply a required order, unless specified to require an order.

FIG. 1 illustrates an example of an embodiment of a simplified one-line diagram of an electric power delivery system 100 with various substations consistent with embodiments of the present disclosure. Electric power delivery system 100 may be configured to generate, transmit, and distribute electric energy to loads. Electric power delivery systems may include equipment, such as electric generators (e.g., generators 110, 112, 114, and 116), power transformers (e.g., transformers 117, 120, 122, 130, 142, 144 and 150), power transmission and delivery lines (e.g., lines 124, 134, and 158), circuit breakers (e.g., breakers 152 and 160), busses (e.g., busses 118, 126, 132, and 148), loads (e.g., loads 140, and 138) and the like. A variety of other types of equipment may also be included in electric power delivery system 100, such as voltage regulators, capacitor banks, and a variety of other types of equipment.

Substation 119 may include a generator 114, which may be a distributed generator, and which may be connected to bus 126 through step-up transformer 117. Bus 126 may be connected to a distribution bus 132 via a step-down transformer 130. Various distribution lines 136 and 134 may be connected to distribution bus 132. Distribution line 136 may lead to substation 141 where the line is monitored and/or controlled using IED 106, which may selectively open and close breaker 152. Load 140 may be fed from distribution line 136. Further step-down transformer 144 in communication with distribution bus 132 via distribution line 136 may be used to step down a voltage for consumption by load 140.

Distribution line 134 may lead to substation 151, and deliver electric power to bus 148. Bus 148 may also receive electric power from distributed generator 116 via transformer 150. Distribution line 158 may deliver electric power from bus 148 to load 138, and may include further step-down transformer 142. Circuit breaker 160 may be used to selectively connect bus 148 to distribution line 134. IED 108 may be used to monitor and/or control circuit breaker 160 as well as distribution line 158.

Electric power delivery system 100 may be monitored, controlled, automated, and/or protected using intelligent electronic devices (IEDs), such as IEDs 104, 106, 108, 115, and 170, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, buses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, 115, and 170) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

A common time signal may be distributed throughout system 100. Utilizing a common or universal time source may ensure that IEDs have a synchronized time signal that can be used to generate time synchronized data, such as synchrophasors. In various embodiments, IEDs 104, 106, 108, 115, 170 may receive a common time signal 168. The time signal may be distributed in system 100 using a communications network 162 or using a common time source, such as a Global Navigation Satellite System ("GNSS"), or the like. As illustrated, the central IED 170 and IED 108 both receive common time signal 168. Other IEDs may receive the common time signal 168 via a communications network or a dedicated time distribution network as described in more detail herein.

According to various embodiments, central monitoring system 172 may comprise one or more of a variety of types of systems. For example, central monitoring system 172 may include a supervisory control and data acquisition (SCADA) system and/or a wide area control and situational awareness (WACSA) system. A central IED 170 may be in communication with IEDs 104, 106, 108, and 115. IEDs 104, 106, 108 and 115 may be remote from the central IED 170, and may communicate over various media such as a direct communication from IED 106 or over a wide-area communications network 162. According to various embodiments, certain IEDs may be in direct communication with other IEDs (e.g., IED 104 is in direct communication with central IED 170) or may be in communication via a communication network 162 (e.g., IED 108 is in communication with central IED 170 via communication network 162).

Communication via network 162 may be facilitated by networking devices including, but not limited to, multiplexers, routers, hubs, gateways, firewalls, and switches. In some embodiments, IEDs and network devices may comprise physically distinct devices. In other embodiments, IEDs and network devices may be composite devices, or may be configured in a variety of ways to perform overlapping functions. IEDs and network devices may comprise multi-function hardware (e.g., processors, computer-readable storage media, communications interfaces, etc.) that can be utilized in order to perform a variety of tasks that pertain to network communications and/or to operation of equipment within system 100.

As discussed above, an IED may be configured to calculate and communicate synchrophasors with other IEDs. To accurately compare synchrophasors obtained by geographically separate IEDs, each IED may need to be synchronized with a precision time reference with accuracy greater than a millisecond to allow for time-aligned comparisons. According to various embodiments, time synchronization, accurate to the microsecond or nanosecond range, may allow IEDs to perform accurate comparisons of synchrophasors.

Figure 2:
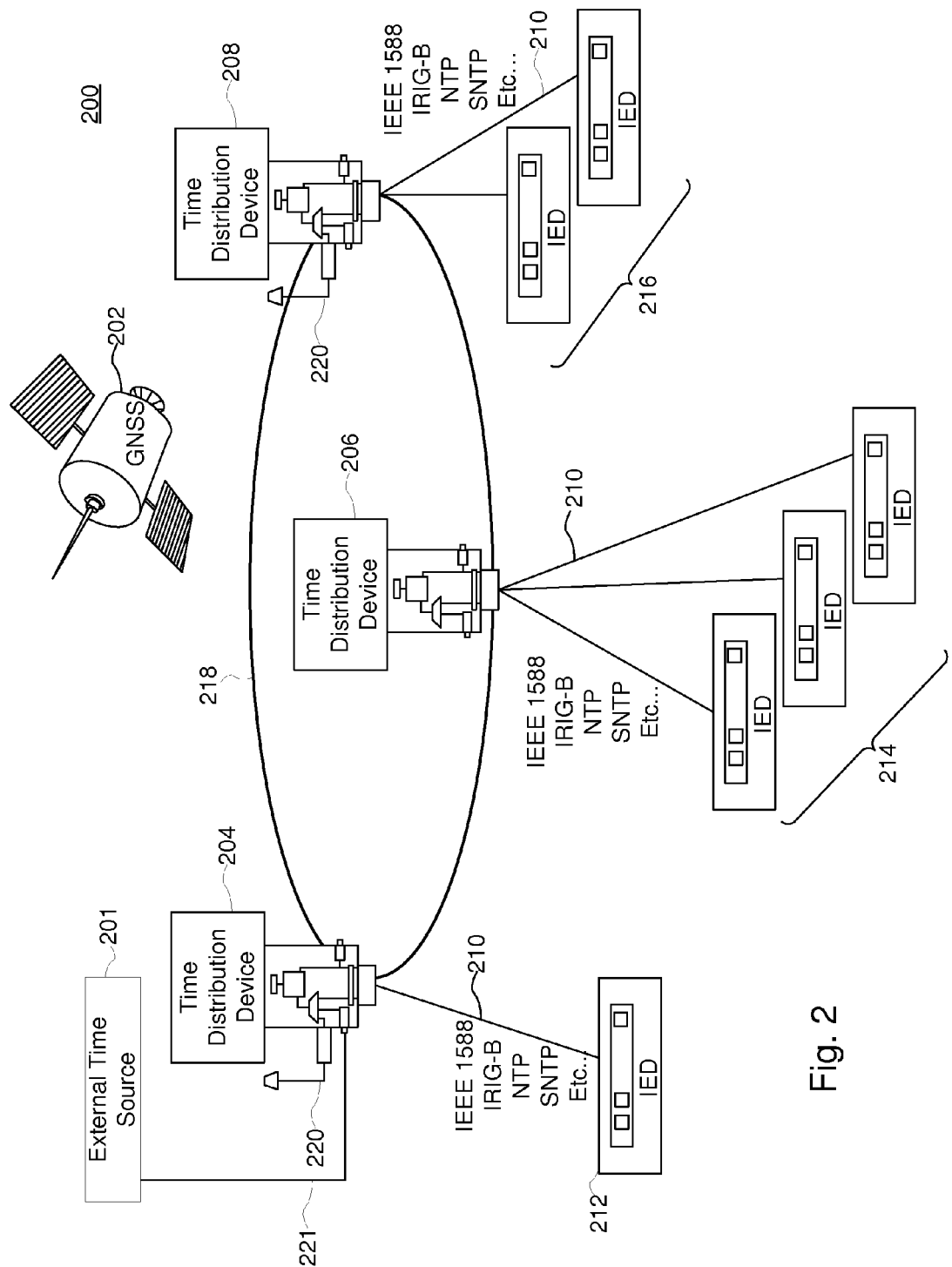
FIG. 2 illustrates a time distribution system including communications IEDs configured to distribute a precision time reference to various IEDs.

FIG. 2 illustrates system 200 configured to be a highly reliable, redundant, and distributed system of time distribution devices 204, 206, and 208 capable of providing a precision time reference to various time dependent IEDs 212, 214, and 216. Each time distribution device 204, 206, and 208 may be configured to receive and communicate time signals through multiple protocols and methods. While the system 200 is described as being capable of performing numerous functions and methods, it should be understood that various systems are possible that may have additional or fewer capabilities. Specifically, a system 200 may function as desired using only one protocol, or having fewer external or local time signal inputs.

As illustrated in FIG. 2, three time distribution devices 204, 206, and 208 have WAN capabilities and are communicatively connected to a WAN 218, which may comprise one or more physical connections and protocols. Each time distribution device 204, 206, and 208 may also be connected to one or more IEDs within a local network. For example, time distribution device 204 is connected to IED 212, time distribution device 206 is connected to IEDs 214, and time distribution device 208 is connected to IEDs 216. A time distribution device may be located at, for example, a power generation facility, a hub, a substation, a load center, or other location where one or more IEDs are found. In various embodiments, an IED may include a WAN port, and such an IED may be directly connected to WAN 218. IEDs may be connected via WAN 218 or LANs 210. Time distribution devices 204, 206, and 208 may establish and maintain a precision time reference among various system components. Each time distribution device 204, 206, and 208 may be configured to communicate time information with IEDs connected on its LAN through one or more time distribution protocols, such as IEEE 1588, IRIG-B, NTP, SNTP, and the like.

Each time distribution device 204, 206, and 208 may be configured to receive time signals from a variety of time sources. For example, as illustrated, time distribution device 204 includes an antenna 220 and is configured to receive a GNSS signal from a GNSS repeater or satellite 202. Time distribution device 204 is also configured to receive a second time signal 221 from an external time source 201. The external time source may comprise one or more VCTCXOs, phase locked loop oscillators, time locked loop oscillators, rubidium oscillators, cesium oscillators, NIST broadcasts (e.g., WWV and WWVB), and/or other devices capable of generating precise time signals. In the illustrated embodiment, time distribution device 208 includes an antenna 220 configured to receive a GNSS signal from the GNSS repeater or satellite 202. As illustrated, time distribution device 206 does not directly receive an external time signal, however, according to alternative embodiments, any number and variety of external time signals may be available to any of the time distribution devices.

According to one embodiment, WAN 218 comprises a SONET configured to embed a precision time reference in a header or overhead portion of a SONET frame during transmission. Alternatively, a precision time reference may be conveyed using any number of time communications methods including IRIG protocols, NTP, SNTP, synchronous transport protocols (STP), and/or IEEE 1588 protocols. According to various embodiments, including transmission via SONET, a precision time reference may be separated and protected from the rest of the WAN network traffic, thus creating a secure time distribution infrastructure. Protocols used for inter IED time synchronization may be proprietary, or based on a standard, such as IEEE 1588 Precision Time Protocol (PTP).

According to various embodiments, time distribution devices 204, 206, and 208 are configured to perform at least one of the methods of detecting failure of a time source described herein. System 200 may utilize a single method or combination of methods, as described herein.

It is of note that even the most precise time signals may exhibit small discrepancies. For example, depending on the length and routing of the GNSS antenna cable, various clocks may exhibit microsecond level time offsets. Some of these offsets may be compensated by the user entering compensation settings, or may need to be estimated by the time synchronization network. Estimation may be performed during long periods of "quiet" operation (i.e., periods with no faults), with the individual source results stored locally in a nonvolatile storage register.

Figure 3:
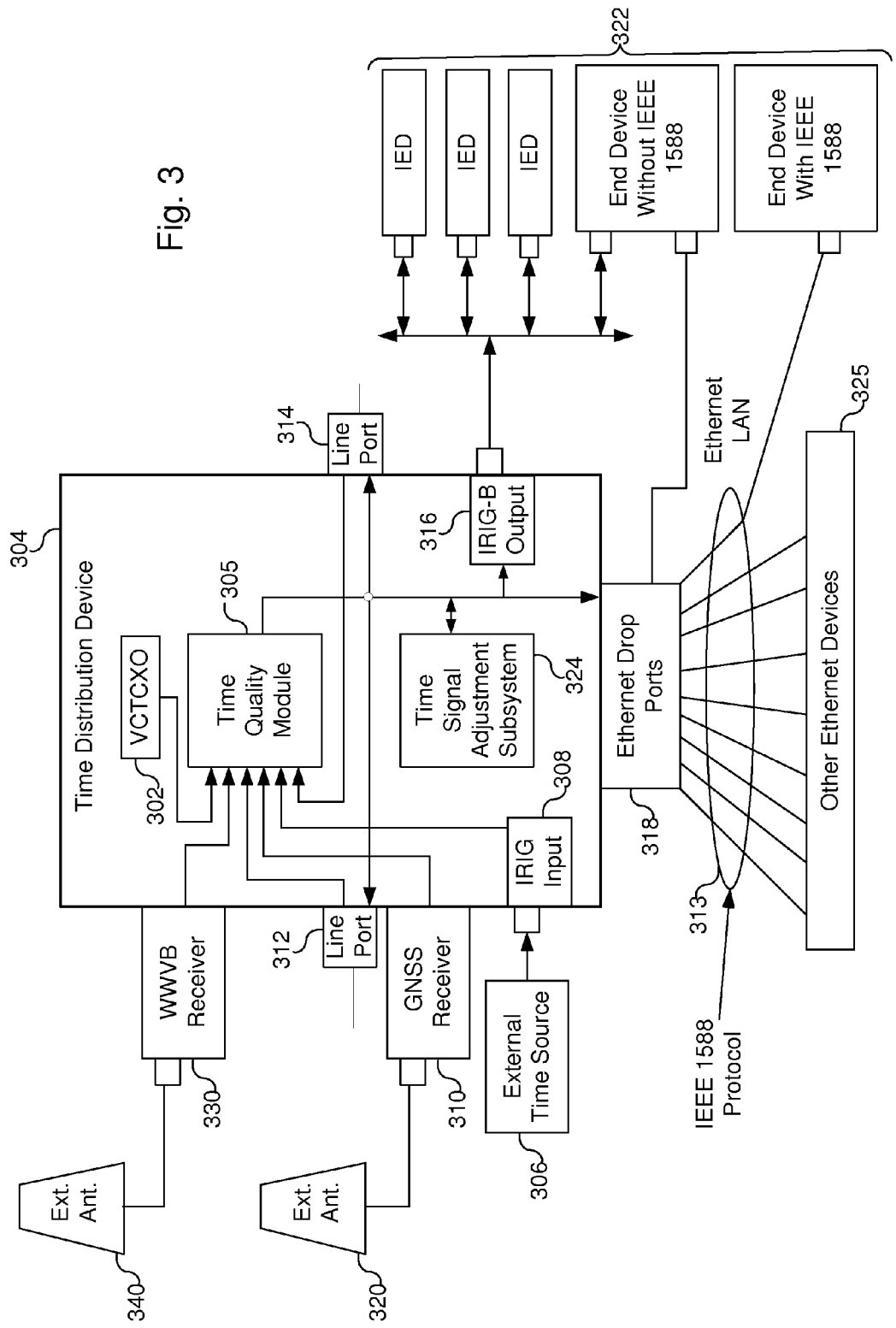
FIG. 3 illustrates an embodiment of a time distribution device configured to receive, distribute, and/or determine a precision time reference.

FIG. 3 illustrates a time distribution device 304, according to one embodiment. A time distribution device 304 may include more or less functionality than the illustration. For example, time distribution device 304 may include an interface for monitoring equipment in an electric power delivery system in certain embodiments. Accordingly, in various embodiments time distribution device 304 may be implemented either as an IED or as a network device. As illustrated, time distribution device 304 includes a local time source 302 that provides a local time signal and a time quality module 305 for establishing a precision time reference. Time distribution device 304 further includes a pair of line ports 312 and 314 for communications with a WAN or LAN. Time information may be shared over a network and may also be fed into the time quality module 305. Further, time distribution device 304 includes a GNSS receiver 310 for receiving a precision time signal, such as time from a GNSS via a GNSS antenna 320. Time distribution device 304 also includes a WWVB receiver 330 for receiving an NIST broadcast, which can be used as a precision time signal, via an external antenna 340. The received precision time signal from either source is communicated to the time quality module 305 for use in determining and distributing the precision time reference.

Another time source that may be fed to the time quality module 305 includes an external time source 306 that may conform to a time distribution protocol, such as IRIG. The external time source 306 may communicate with another time port such as an IRIG input 308.

The various time information from the WAN or LAN (from line ports 312 and/or 314), GNSS receiver 310, WWVB receiver 330, and IRIG input 308 are input into the time quality module 305. Time information received over the WAN could be in any form used to transmit time information such as, for example, NTP, SNTP, PTP (IEEE 1588), or the like. Multiple time signals may be received using the WAN. In one embodiment, the inputs may be fed into a multiplexer (not shown) prior to being input into the time quality module 305. The time quality module 305 functions to determine a precision time reference for use by the various devices connected to the time distribution device 304. The precision time reference is then communicated from the time quality module 305 to the various devices 322 using IRIG protocol (via the IRIG-B output 316) or to various devices 325 using another protocol 313 such as IEEE 1588 using Ethernet Drop Ports 318. The Ethernet Drop Ports 318 may also include network communications to the various devices connected to time distribution device 304. Time distribution device 304 may further include connections to SONETs and transmit the precision time reference in a header or overhead portion of SONET frames.

Time distribution device 304 may also comprise a time signal adjustment subsystem 324. Time signal adjustment subsystem 324 may be configured to track drift rates associated with various external time sources with respect to local time source 302. Time signal adjustment subsystem 324 may also communicate time signals according to a variety of protocols. Such protocols may include inter-Range Instrumentation Group protocols, IEEE 1588, Network Time Protocol, Simple Network Time Protocol, synchronous transport protocol, and the like. In various embodiments, time signal adjustment subsystem 324 may be implemented using a processor in communication with a computer-readable storage medium containing machine executable instructions. In other embodiments, time signal adjustment subsystem 324 may be embodied as hardware, such as an application specific integrated circuit or a combination of hardware and software.

According to various embodiments, the time quality module 305 determines whether a primary or "best available" time source is reliable, i.e., has not failed, and distributes the time signal from the best available time source as the precision time reference to time dependent devices in the system. If the best available time source has failed, the time quality module 305 provides an error alert to a user, and in some embodiments, enters a holdover period where an alternative time signal is used for the precision time reference. These techniques allow for the best available time source to be used as precision time reference provided to time dependent devices in a robust manner such that there is a high likelihood that the precision time reference is accurate. Moreover, in certain embodiments, relying on a secondary time source provided to the time quality module 305 as the precision time reference during a holdover period when the primary time reference has failed may provide more accurate time information than the holdover situation described above where a local oscillator in each time dependent device is used during the holdover.

In some embodiments, after a period of time using the secondary time source, a primary time source may become available again. The time quality module 305 may determine whether the primary time source is reliable. If the primary time source is reliable, the time distribution device 304 may begin using the primary time source for the precision time reference. If however, the primary time source is determined to be unreliable, the time distribution device 304 may continue using the secondary time source for the precision time reference and provide an error alert to a user indicating the availability and unreliability of the primary time source.

Figure 4:
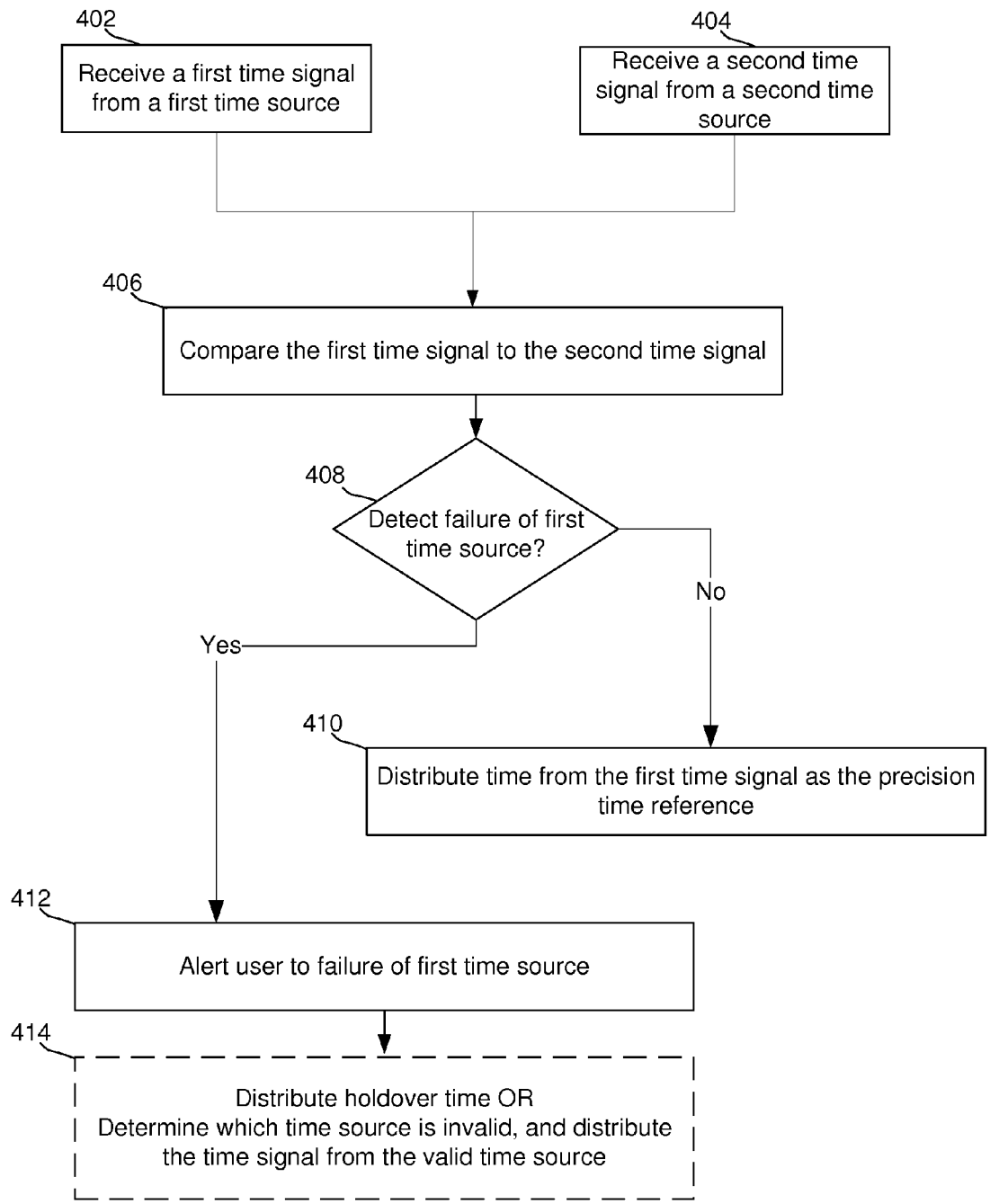
FIG. 4 illustrates one embodiment for determining whether a primary or best available time source has failed.

FIG. 4 illustrates one embodiment for determining whether a primary or best available time source has failed. While the time signals in the example of FIG. 4 are described as specific signals, other signals may be used with similar results. Furthermore, although FIG. 4 and others specifically may recite a first time signal and a second time signal, any number of time signals may be present and used in the embodiments described herein. At 402 the time distribution device receives a first time signal from a first time source, or best available time source, and provides the time signal to the time quality module. In one embodiment, the first time source is a time signal received from a GNSS system. GNSS time has the advantages of relying on extremely accurate methods for providing the time signal to GNSS receivers, being readily available worldwide (particularly in remote locations) 24 hours per day, and is expected to be stable for many decades to come. GNSS receivers can keep an internal time, based on the GNSS signal that is accurate to better than nanoseconds and the time output at the 1 PPS dedicated time port is typically better than 1 microsecond.

At 404 the time distribution device receives a second time signal from a second time source. In one embodiment, the second time source is a NIST broadcast such as WWVB. While not as accurate as a time reference derived from a GNSS signal, a time reference derived from a WWVB broadcast is still very accurate. While the example of FIG. 4 specifically uses a WWVB broadcast as the second time source, one of skill in the art will recognize that other time sources, such as those described above, can be used in place of the WWVB broadcast.

At 406 the time quality module compares the first time signal to the second time signal. Each of the time signals received by the time quality module have an inherent error bound related to the accuracy of the time signal. In one embodiment, the time quality module compares the time signals with regard to their respective error bounds to determine whether the first time source has failed. For example, given the relatively smaller error bound found in the time derived from a GNSS signal compared to that found in a time derived from a WWVB broadcast, the time based on the GNSS signal should fall within the error bound of the time based on the WWVB broadcast. However, if the GNSS based time signal falls outside of the error bound of the WWVB based time signal, the time quality module detects, at 408, that there is an error with the GNSS based time signal.

If, at 408, the time quality module determines that the first time source has not failed, the time quality module distributes time from the first time signal as the precision time reference at 410. If, at 408, the time quality module determines that the first time source has failed, at 412 the time quality module alerts a user that the best available time source has failed and that the time may not be accurate. The method may also continue to distribute a holdover time or determine which time source is invalid, and distribute the time signal from the valid time source 814. In determining which time source is invalid, the system may compare each time signal against its internal time, and select the time signal with the least difference from its own internal time.

In certain embodiments, more than two time signals may be available. Upon failure of the first time source (which may be the best or preferred time source), the method may distribute time from the second time signal or another available time signal at 414. The method may distribute time from the best available time signal 414 upon detection of a failure of the first time source.

While the example of FIG. 4 is limited to a first and second time signal, the time quality module can continue to compare time signals in order of relative error bounds beyond just a first and second time signal. For example, the WWVB based time may be compared to the time of a local oscillator (taking into account the drift rate of the oscillator) to determine whether the WWVB source has failed. When another time source is available, it can also be compared with the WWVB time source and the local oscillator to determine a failure. When a failure is detected, the best available time source that is not under failure may be used for distribution of the time signal.

Figure 5:
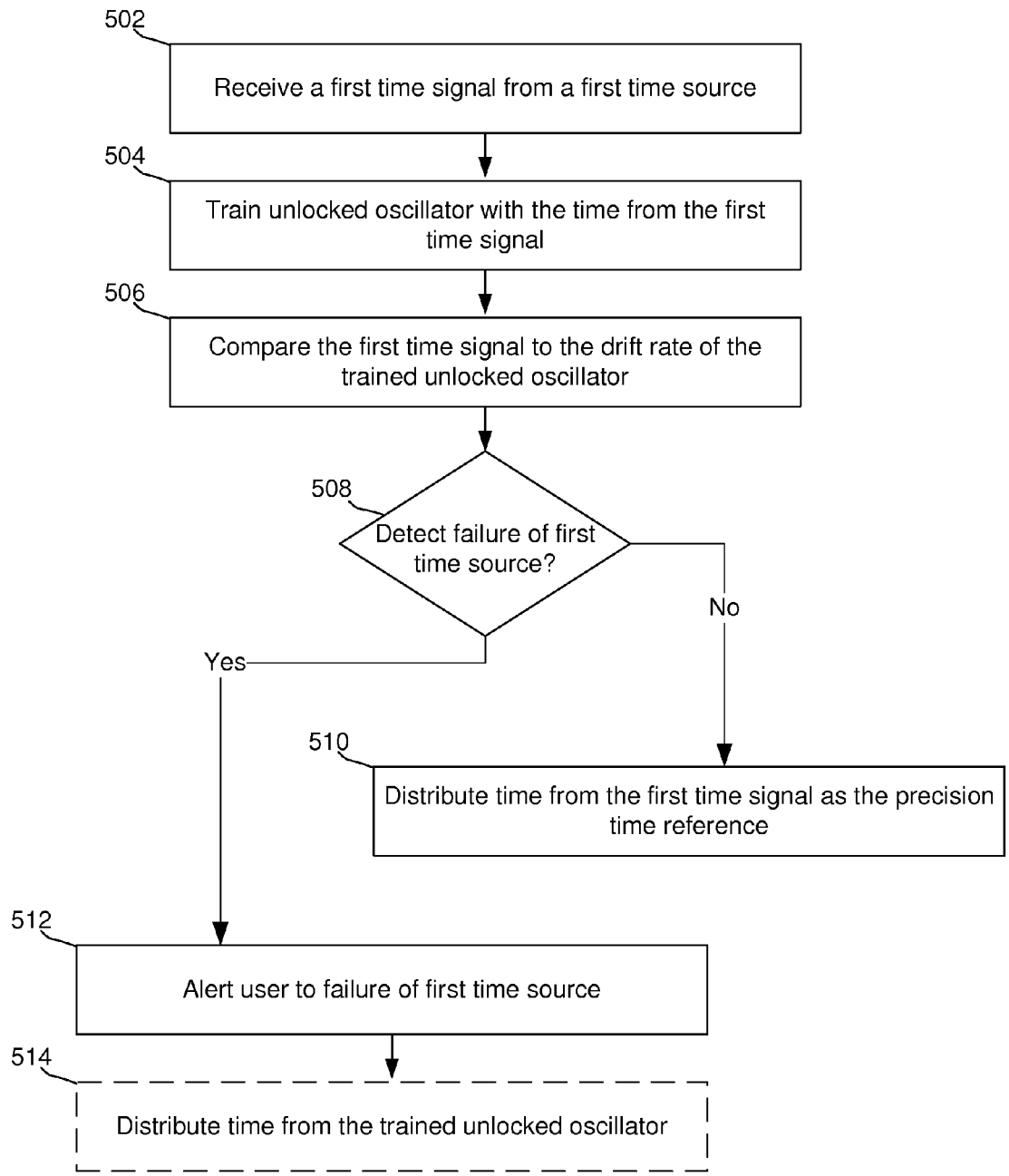
FIG. 5 illustrates another embodiment for determining whether a primary or best available time source has failed.

FIG. 5 illustrates a second embodiment for determining whether a primary or best available time source has failed. While the time signals in the example of FIG. 5 are described as specific signals, other signals may be used with similar results. At 502 the time distribution device receives a first time signal from a first time source, or best available time source, and provides the time signal to the time quality module. In one embodiment, the first time source is a time signal received from a GNSS system.

At 504 the time distribution device uses the first time signal to train an unlocked oscillator to track the time provided in the first time signal. While the oscillator is trained to track the time of the first time source, because the oscillator is unlocked the time provided by the trained oscillator will drift from that of the first time signal. However, the rate of drift is low and the time distribution device maintains the training relationship between the first signal and the oscillator such that the drift is corrected.

At 506 the time quality module compares the first time signal to the trained oscillator (again, taking into account the drift rate associated with the trained oscillator). In one embodiment, a counter tracks the number of oscillations of the oscillator between each PPS received from the first time signal. Because the oscillator is trained to the first time signal, any variation in the oscillation count from PPS to PPS should be low. If there is a large jump in the variation in the oscillation count, the time quality module, at 508, detects a failure of the first time source. The threshold for determining whether the time quality module detects a failure of the time source may depend on the characteristics of the oscillator used. For example, a temperature compensated crystal oscillator (TCXO) may have a drift rate in the parts-per-million range while oven controlled crystal oscillators and cesium based oscillators may have a drift rate in the parts-per-billion. Thus, the threshold for the more accurate oscillator may be higher. If the variation in the oscillation count exceeds the threshold, the time quality module may indicate a failure of the first time source.

In another embodiment, the oscillator may be used to validate time quality measurements transmitted as part of the time source. For example, an IRIG signal includes a Time Quality and Continuous Time Quality indication. The time quality module may use the oscillator to validate the time quality signal received as part of the time source.

If, at 508, the time quality module determines that the first time source has not failed, the time quality module distributes time from the first time signal as the precision time reference at 510. If, at 508, the time quality module determines that the first time source has failed, at 512 the time quality module alerts a user that the best available time source has failed and that the time may not be accurate. In addition to alerting a user of the failure, the time quality module at 514 can optionally distribute time from the trained oscillator, or a second time source, as the precision time reference during a holdover period.

In some embodiments, if a second time source is to be used for the precision time reference, the time quality module may determine whether the second time source is acceptable. For example, the time quality module may determine whether the time provided by the second time source falls within an acceptable range of the current time provided by the time distribution device (e.g., time kept by the internal oscillator). If the time falls within the acceptable range, the second time source may be used to provide the precision time reference.

Figure 6:
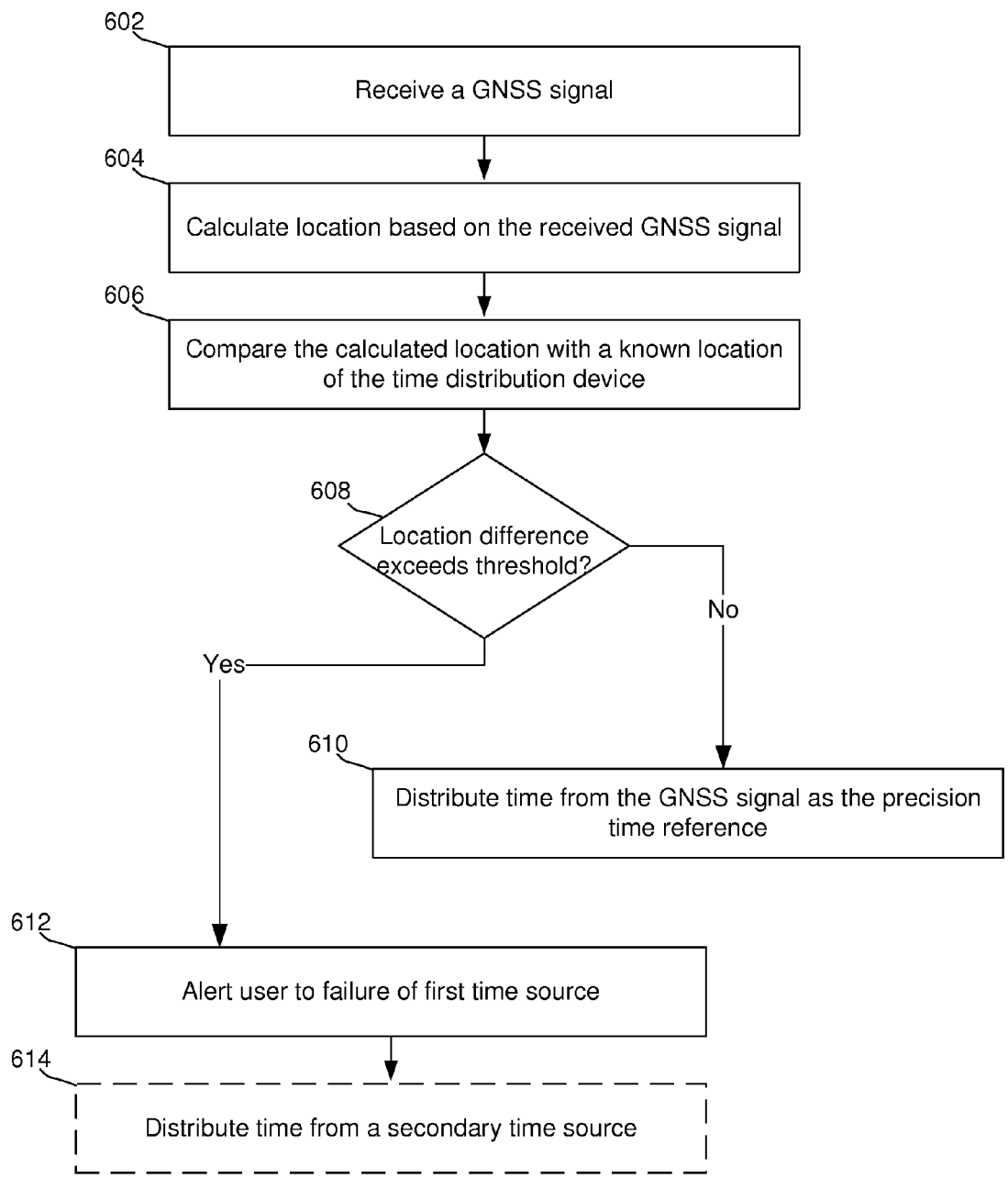
FIG. 6 illustrates one embodiment for determining whether a primary or best available time source has failed based on GNSS location.

The example embodiments above provide for a robust system of providing a precision time reference to time dependent devices by comparing several time signals to determine whether the best available time source has failed. FIG. 6 illustrates one embodiment for determining whether a primary or best available time source has failed based on GNSS location. In embodiments where GNSS is the best available time source, the location derived from the GNSS signal can be used a check for failure of the GNSS time source. This method is particularly useful in embodiments where the time distribution device is at a known, fixed location. In one embodiment, the known location of the time distribution device can be entered by a user at the time of setup and can be modified as necessary. In another embodiment, the known location of the time distribution device can be calculated using GNSS signals.

At 602 the time distribution device receives the GNSS signal. While the example of FIG. 6 is described in terms of a single GNSS signal for clarity, one of ordinary skill in the art will recognize that multiple signals from various GNSS satellites are typically used in determining GNSS receiver location and can be used to more accurately calculate GNSS receiver location. At 604, the GNSS receiver calculates the location of the time distribution device based on the received GNSS signal. The time quality module, at 606, compares the calculated location of the time distribution device with the known location of the time distribution device and determines whether the calculated location falls within a threshold distance from the known location. Because GNSS location calculation varies based on the techniques employed by the GNSS receiver, the threshold distance can vary from device to device.

If, at 608, the time quality module determines that the GNSS location falls within the threshold, the time quality module distributes the GNSS time as the precision time reference at 610. If, at 608, the time quality module determines that the GNSS location falls outside of the threshold and therefore the GNSS time source has failed, at 612 the time quality module alerts a user that the best available time source has failed and that the time may not be accurate. In addition to alerting a user of the failure, the time quality module at 614 can optionally distribute time from a secondary time source as the precision time reference during a holdover period.

In another embodiment, the time quality module may calculate a location drift rate using the GNSS signal and compare the location drift rate to a defined threshold. If the location drift rate exceeds the defined threshold, the time quality module may determine, at 608, that the GNSS time source has failed.

In one embodiment, the time quality module monitors instantaneous and average GNSS signal strength. If the instantaneous signal strength is larger than a set threshold for a set number of samples, then the time quality module may determine that the GNSS time source has failed. In such an instance, the time quality module may alert a user and/or rely upon a secondary time signal.

In another embodiment, satellite constellation may be monitored. Satellite constellation repeats every 24 hours. The time quality module may determine that the GNSS time source has failed by detecting a change in satellite constellation. In such an instance, the time quality module may alert a user and/or rely on a secondary time signal.

Figure 7:
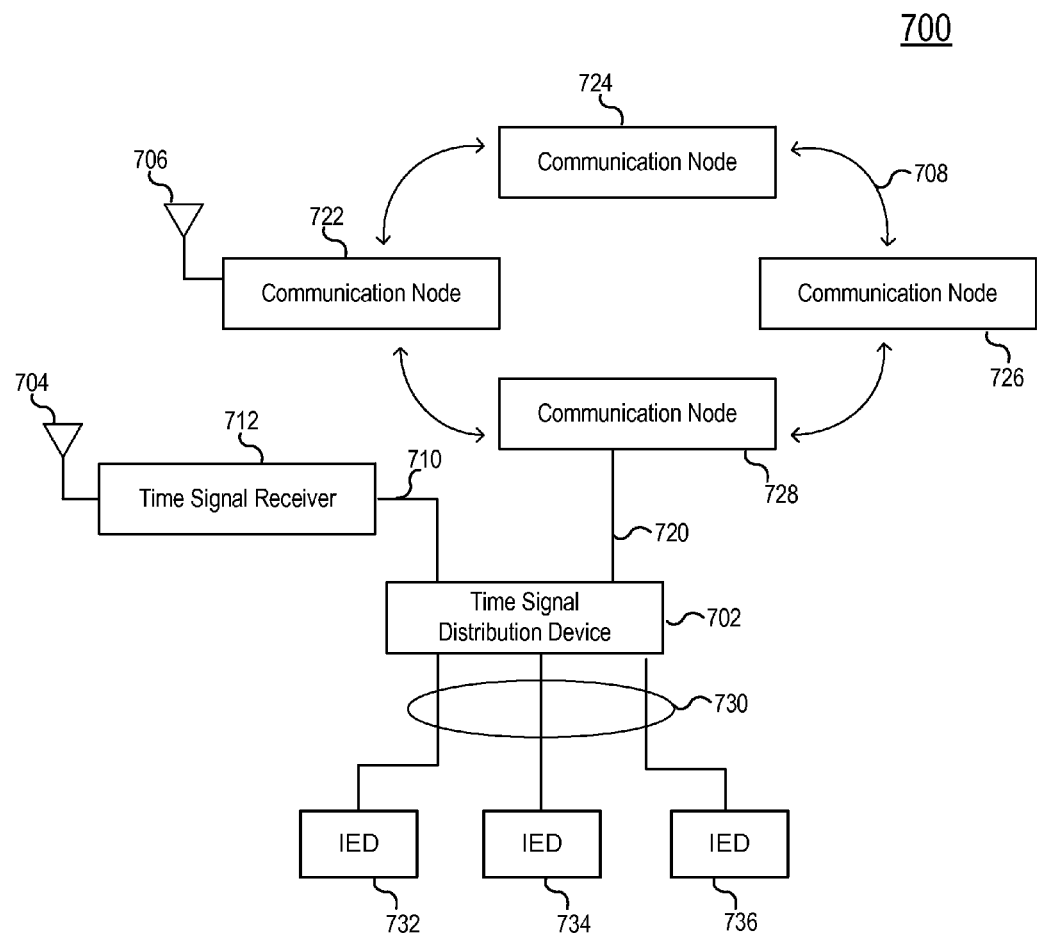
FIG. 7 illustrates a time distribution system including a time signal verification and distribution device.

FIG. 7 illustrates a system 700 for time signal verification and distribution to consuming devices. System 700 includes a time signal verification and distribution device 702 that receives multiple time signals 710 and 720, and distributes a verified time signal 730 to consuming devices 732, 734, 736. The consuming devices 732, 734, 736 may be various devices such as devices 322 as illustrated in FIG. 3. In one embodiment, the consuming devices 732, 734, 736 may be IEDs. In one embodiment, the time signal verification and distribution device 702 may be an IRIG distribution module such as the SEL-3400 IRIG-B Distribution Module available from Schweitzer Engineering Laboratories, Inc. in Pullman, Wash., USA. In another embodiment, the time signal verification and distribution device 702 may be within a GNSS clock such as GNSS clock 712. In this embodiment, the GNSS clock 712 may also receive the second time signal 720, and perform the functions of the verification and distribution device 702. In certain embodiments, the time signal verification and distribution device 720 may be capable of being added on to an existing time distribution system to verify and distribute a verified time signal to consuming devices.

The illustrated verification and distribution device 702 is illustrated as receiving two time signals 710 and 720. Time signal 710 may be from a GNSS time source. According to one embodiment, time signal 710 may be an IRIG output from a GNSS clock 712, that receives a GNSS signal using a local antenna 704. Time signal 720 may be another IRIG signal from a wide area network 708, which may be similar to the WAN 218 of FIG. 2. WAN 218 may include a number of communication nodes 722, 724, 726, 728 configured to, among other things, distribute a common time signal throughout the WAN 708. One (or more) of the communication nodes 722 may receive a common time signal such as a GNSS signal using antenna 706.

GNSS antenna 704 and GNSS antenna 706 may be co-located. However, according to the illustrated embodiment, GNSS antennas 704 and 706 may be located at disparate locations, one antenna remote from the other. The distance between antennas 704 and 706 may incorporate a wide area. In one specific embodiment, the antennas 704 and 706 are separated by sufficient distance such that a terrestrial spoofing source would likely only be able to affect one of the two antennas, but not both. Thus, antennas 704 and 706 may be separated by at least 200 m. In one embodiment, antennas 704 and 706 are separated by from around 200 m to around 5 km; or from around 300 m to around 1 km. In such an embodiment, spoofing of the time signals may be detected as further described herein.

Figure 8:
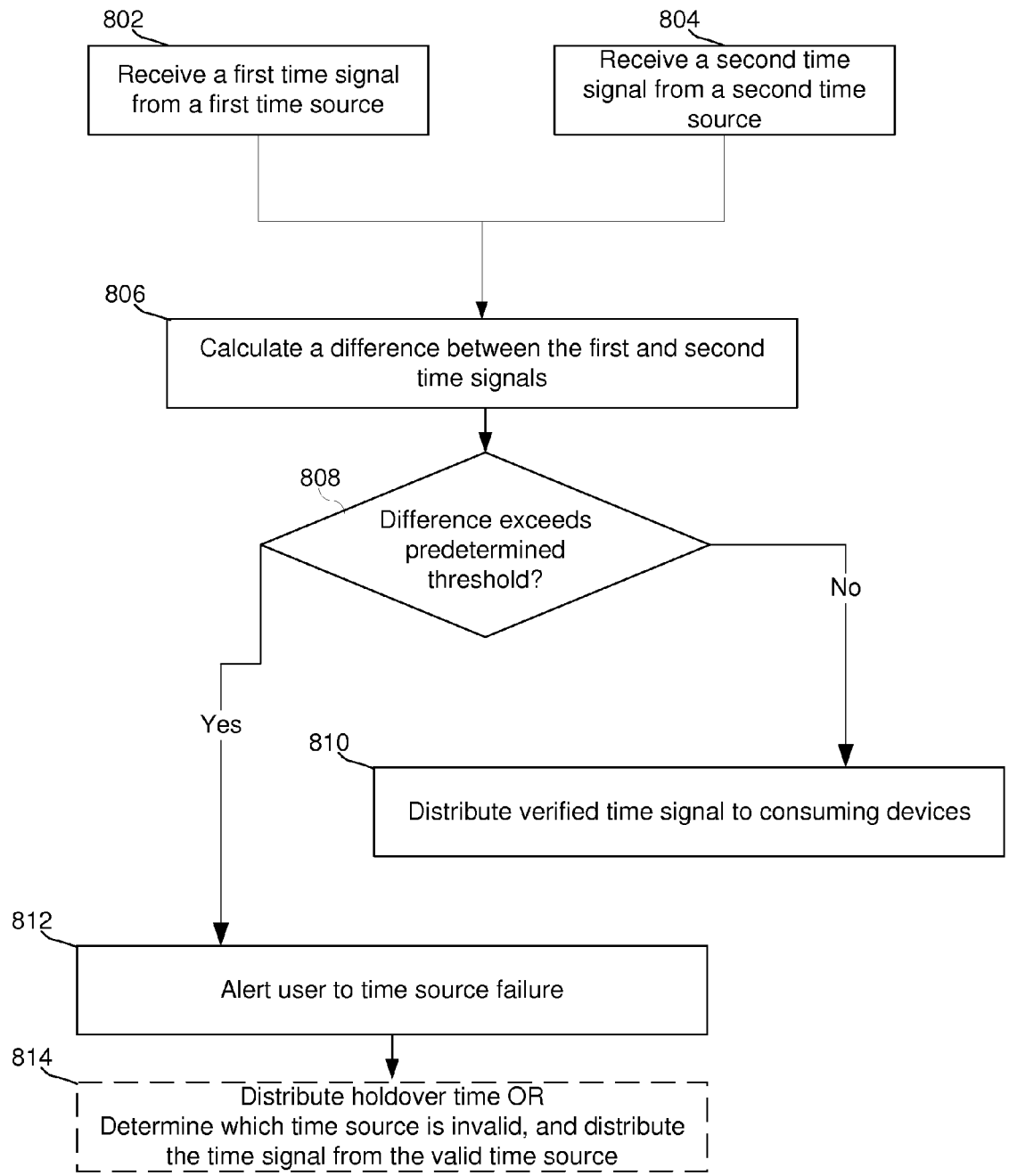
FIG. 8 illustrates an embodiment for verifying and distributing a time signal.

The time signal verification and distribution device 702 may verify the time signals 710 and 720 before distributing a verified time signal 730 to consuming devices 732, 734, 736. FIG. 8 illustrates a method 800 for verifying and distributing authenticated verified time signal. The method 800 starts by receiving a first time signal from a first time source 802 and receiving a second time signal from a second time source 804. The time signal verification and distribution device 702 may then calculate a difference between the first and second time signals 806. The difference may be calculated by determining a time between rising edges of the first and second time signals. The difference may be calculated by averaging calculated differences for a predetermined period of time.

Once the difference is calculated, the method determines whether the difference exceeds a predetermined threshold 808. The predetermined threshold may depend on how accurate the time signal needs to be for the consuming devices. The predetermined threshold may be calculated using a maximum expected difference between the first and second time signals. The maximum expected difference may be calculated using a maximum expected difference between the time sources and cabling and other communication delays. In one embodiment, the predetermined threshold may be from around 10 ns to around 1 ms; or from around 25 ns to around 100 ns; or around 50 ns.

When the predetermined threshold is calculated using the maximum expected difference between the time signals, anomalies such as cable problems, communication network problems, oscillator problems, phase locked loop problems, or the like. Such threshold may also be used to determine whether a spoofing attack is being performed. Typically, spoofing attacks are terrestrial in nature and only able to affect a relatively small geographical area. If the antennas are placed in different locations with a distance between them greater than what can be affected in a spoofing attack, then only one of the antennas, and hence only one of the time signals, will be effected. Once the time signals are further apart than the predetermined threshold, then the time signal would no longer be verified, and the spoofing attack may be thwarted. Thus, the method herein may be a method for determining a spoofing attack or other anomaly in a time distribution system.

If the difference does not exceed a predetermined threshold 808, then the method continues to distribute a verified time signal to consuming devices 810. If, however, the time verification and distribution device 702 determines that the difference exceeds a predetermined threshold 808, then the method continues to alert a user to the time source failure 812. This may be performed by de-asserting a time quality bit. This may otherwise be performed by sending a message to a user of the failure. The method may also continue to distribute a holdover time or determine which time source is invalid, and distribute the time signal from the valid time source 814. In determining which time source is invalid, the system may compare each time signal against its internal time, and select the time signal with the least difference from its own internal time.

Although two time signals are illustrated as inputs to device 702, additional time signals may also be inputs to device 702. Furthermore, although certain embodiments herein are described with time signals in an IRIG format from GNSS sources, the time signals 710, 720 may be of any format from any common time source as described in more detail herein, such as, for example, IRIG, GNSS, NIST, WWV, WWBB, WWVH, IEEE 1588, NTP, SNTP, PTP, or the like. Time signals 710 and 720 may each be from the same or different sources, and may be of the same or different protocols. The above description provides numerous specific details for a thorough understanding of the embodiments described herein. However, those of skill in the art will recognize that one or more of the specific details may be omitted, or other methods, components, or materials may be used. In some cases, operations are not shown or described in detail.

For a system where two time signals are received by the time signal distribution device 702, the device 702 may distribute a time signal according to a time quality status of the time signals and according to a comparison of the signals. The time signals may include a quality indicator that may be set by the device that distributes the time signal to the time distribution device. For example, the time signal receiver 712 may determine that time signal 710 is suspect (e.g. using methods illustrated in FIG. 4, 5, or 6 hereof), and set a quality indicator in time signal 710. In another example, one or more of the communication nodes 722-728 may determine that time signal 720 is suspect, and set a quality indicator in time signal 720. Further still, time signal distribution device 702 may determine that time signals 710 or 720 are suspect, and set a time quality bit in the suspect time signal(s). The time signal quality indicator may be, for example, a time quality bit of the IRIG-B standard.

When time signal distribution device 702 receives a time signal with a time quality indicator set or determines that a particular time signal is suspect, it may be configured to not distribute that time signal to consuming devices such as IEDs 732, 734, 736. Furthermore, if time signal distribution device 702 receives both (or all) time signals with a time quality indicator set or determines that both (or all) time signals 710, 720 are suspect, the time distribution device may enter into a holdover mode or cease distributing any of the time signals to the consuming devices such as IEDs 732, 734, 736.

The time signal distribution device 702 may be configured to compare the received time signals 710, 720 such as is illustrated in FIG. 8, to determine whether a difference between the time signals 710, 720 exceeds a predetermined threshold. When the difference does not exceed the predetermined threshold, the time signal distribution device 702 may distribute the verified time signal to consuming devices. Otherwise, the time signal distribution device may follow steps 812 and 814 of FIG. 8. Table 1 illustrates the possible states of the output time signal from a time signal distribution device receiving a first time signal and a second time signal.

| First Time Signal Quality: | Second Time Signal Quality: | Difference Between First and Second Time Signals: | Output Time Signal: |
| --- | --- | --- | --- |
| Good | Good | Difference < threshold | Either First or Second Time Signal Based on User Settings |
| Good | Bad | N/A | First Time Signal |
| Bad | Good | N/A | Second Time Signal |
| Bad | Bad | N/A | Holdover Mode |
| Good | Good | Difference > threshold | Holdover Mode |

Figure 9:
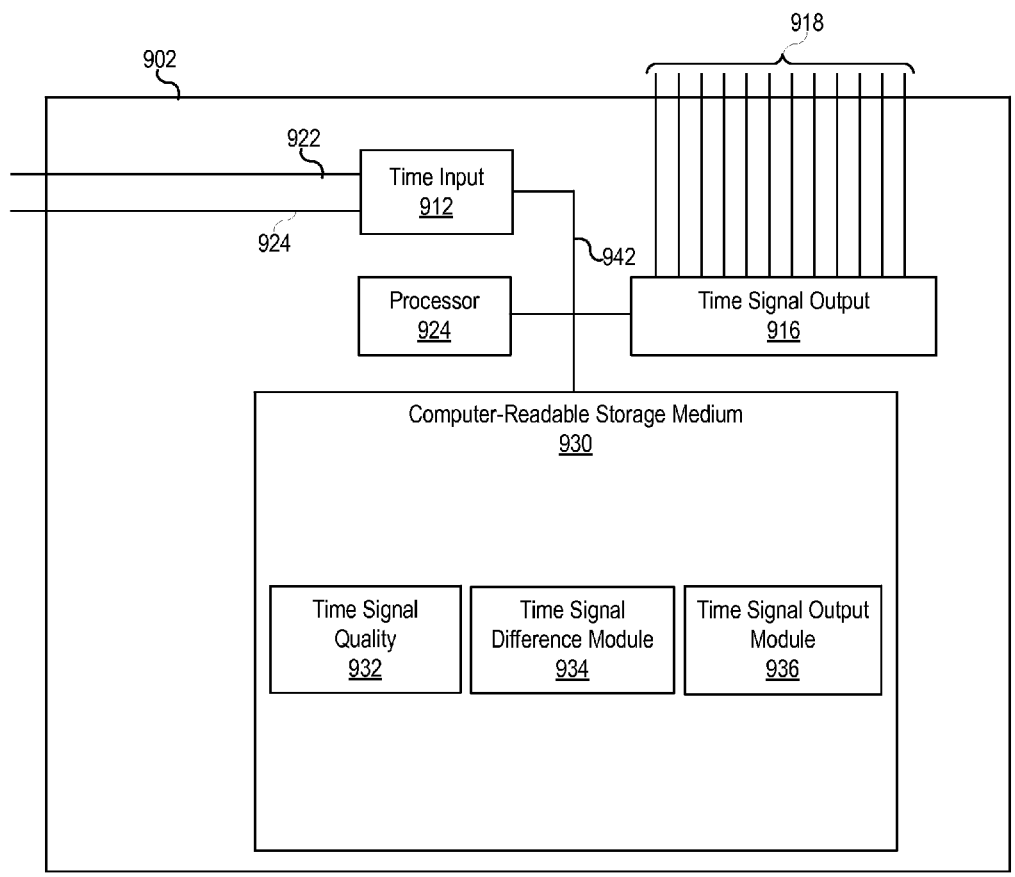
FIG. 9 illustrates a functional block diagram of a time distribution device that may be used according to several embodiments herein.

FIG. 9 illustrates a functional block diagram of a time distribution device 902 that may be used according to several embodiments herein. Time distribution device 902 may include a time input 912 for receiving multiple time signal inputs 922, 924. Time signal inputs may be time signals from two different sources such as, for example, a local clock (e.g. clock 712), distributed time signal (e.g. time signal 720), or the like. Time input 912 may be in communication with processor 924 via bus 942. Processor 924 may be configured to receive time input 912 and execute instructions on the computer-readable storage medium 930 to export a time signal using the time signal output 916. Time signal output may be in communication with, and export a time signal 918 to a plurality of consuming devices such as, for example, IEDs 732, 734, and 736 of FIG. 7.

Computer-readable storage medium 930 may be the repository of various software modules configured to perform any of the methods described herein. Time signal quality module 932 may be configured to determine a quality status of time signals 922 and 924. Time signal quality may be indicated by a quality indicator of the time signal. Otherwise, time signal quality may be determined using the methods described herein.

The time signal difference module 934 may be configured to determine a difference between the time signals 922 and 924, and compare that difference against a predetermined threshold as described in more detail hereinabove.

Time signal output module 936 may be in communication with the time signal quality module 932, time signal difference module 934, and the time input 912. Time signal output module 936 may be configured to determine which time signal to output, or to output a holdover time in accordance with the several embodiments described herein. Time signal output module 936 may be in communication with the time signal output 916 to output the time signal 918 to the consuming devices.

In certain embodiments, the time distribution device may be configured to receive multiple time signals. In such embodiments, time input 912 may include more than two time signal inputs 922, 924. The time signals may be received from different locations. The time signal quality module 932 may determine the time quality of all received time signals, such as the first time signal, the second time signal, a third time signal, and the like. The time distribution device may use the time quality of all received time signals to determine the output time signal.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A time signal verification and distribution device, comprising:
   a time signal receiver for receiving time signals;
   a time input in communication with the time signal receiver, configured to receive from the time signal receiver a first time signal from a first time source and a second time signal from a second time source;
   a time signal quality module in communication with the time input, configured to determine a time quality of the first time signal and the second time signal;
   a time signal difference module in communication with the time input, configured to calculate a difference between the first time signal and the second time signal, and compare the difference to a predetermined threshold;
   a time signal output module in communication with the time signal quality module and the time signal difference module, configured to determine an output time signal based on the comparison and the determined time quality of the first time signal and the second time signal; and
   a time signal output in communication with the time signal output module, configured to output the output time signal to a plurality of time signal consuming devices.

2. The device of claim 1, wherein the time signal quality module is further configured to determine whether the first and second time signals include a quality indication.

3. The device of claim 1, wherein the time signal output module is configured to determine the output time signal as the first time signal when the first time signal quality is not suspect and the second time signal quality is suspect.

4. The device of claim 1, wherein the time signal output module is configured to determine the output time signal as a holdover time signal when the first time signal quality is suspect and the second time signal quality is suspect.

5. The device of claim 1, wherein the time signal output module is configured to determine the output time signal as a holdover time signal when the difference exceeds the predetermined threshold.

6. The device of claim 1, wherein the time signal output module is configured to determine the output time signal as the first time signal when the first time signal quality is not suspect, the second time signal quality is not suspect, and the difference does not exceed the predetermined threshold.

7. The device of claim 1, wherein the first time signal is a GNSS time signal.

8. The device of claim 1, wherein the second time signal is a network time signal.

9. The device of claim 1, wherein the first time signal is derived from a GNSS time signal obtained at a first location and the second time signal is derived from a GNSS time signal obtained at a second location.

10. The device of claim 9, wherein the first location and the second location are separated by 200 m.

11. The device of claim 1, wherein:
    the time input is further configured to receive a third time signal, the time signal
    the time signal quality module is further configured to determine the time quality of the third time signal; and,
    the time signal output module is further configured to determine an output signal based on the determined time quality of the third time signal.

12. A time signal communication system, comprising:
    a first receiver configured to receive a first time signal at a first location, and transmit the first time signal across a wide-area communications network;
    a second receiver configured to receive a second time signal at a second location remote from the first location;
    a time signal verification and distribution device in communication with the wide-area communications network and the second receiver, configured to receive the first time signal and the second time signal, the time signal verification and distribution device comprising:
       a time signal quality module in communication with the time input, configured to determine a time quality of the first time signal and the second time signal;
       a time signal difference module in communication with the time input, configured to calculate a difference between the first time signal and the second time signal, and compare the difference to a predetermined threshold;
       a time signal output module in communication with the time signal quality module and the time signal difference module, configured to determine an output time signal based on the comparison and the determined time quality of the first time signal and the second time signal; and, a time signal output in communication with the time signal output module and the plurality of consuming devices, configured to output the output time signal to the plurality of consuming devices the plurality of consuming devices in communication with the time signal verification and distribution device, configured to receive and use the output time signal from the time signal verification and distribution device.

13. The system of claim 12, wherein the time signal quality module, time signal difference module, and time signal output module comprise a single module.

14. The system of claim 12, wherein the time signal output module is configured to determine the output time signal as the first time signal when the first time signal quality is not suspect and the second time signal quality is suspect.

15. The system of claim 12, wherein the time signal output module is configured to determine the output time signal as a holdover time signal when the first time signal quality is suspect and the second time signal quality is suspect.

16. The device of claim 12, wherein the time signal output module is configured to determine the output time signal as a holdover time signal when the difference exceeds the predetermined threshold.

17. The device of claim 12, wherein the time signal output module is configured to determine the output time signal as the first time signal when the first time signal quality is not suspect, the second time signal quality is not suspect, and the difference does not exceed the predetermined threshold.

18. The device of claim 12, wherein the first time signal is a GNSS time signal.

19. The device of claim 12, wherein the second time signal is a network time signal.

20. The device of claim 12, wherein the first time signal is derived from a GNSS time signal obtained at a first location and the second time signal is derived from a GNSS time signal obtained at a second location.

21. The device of claim 20, wherein the first location and the second location are separated by 200 m.

22. The time signal communication system of claim 12, further comprising a third receiver configured to receive a third time signal at a third location remote from the first and second locations; and wherein:

the time signal quality module is further configured to determine the time quality of the third time signal; and, the time signal output module is further configured to determine an output signal based on the determined time of the third time signal.

23. A method comprising:

receiving, at a time signal receiver of a time distribution device, a first time signal;

receiving, at the time distribution device, a second time signal;

determining a time quality status of the first time signal and the second time signal;

calculating a difference between the first time signal and the second time signal;

comparing the difference to a predetermined threshold;

distributing an output time signal to a plurality of consuming devices based on the determination of the time quality status of the first time signal and the second time signal and the comparison of the difference to the predetermined threshold, wherein the output time signal comprises one selected from the group consisting of the first time signal, the second time signal, and a holdover time.

* * * * *